United States Patent
Singh

(10) Patent No.: US 11,170,313 B2
(45) Date of Patent: Nov. 9, 2021

(54) PIPELINING AND PARALLELISM FOR IMPLEMENTING A MIXTURE MODEL

(71) Applicant: Analog Devices International Unlimited Company, Limerick (IE)

(72) Inventor: Raka Singh, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 1386 days.

(21) Appl. No.: 14/575,198

(22) Filed: Dec. 18, 2014

(65) Prior Publication Data

US 2016/0104072 A1    Apr. 14, 2016

Related U.S. Application Data

(60) Provisional application No. 62/062,484, filed on Oct. 10, 2014.

(51) Int. Cl.
| | | |
|---|---|---|
| *G06N 5/02* | (2006.01) | |
| *G06F 17/00* | (2019.01) | |
| *G06N 7/00* | (2006.01) | |

(52) U.S. Cl.
CPC .................................. *G06N 7/005* (2013.01)

(58) Field of Classification Search
CPC . G06T 7/194; G06T 7/11; G06T 2207/10016; G06T 7/44; G06T 2207/20081; G06T 2207/20084; G06F 17/18; G06F 11/24; G06F 1/28; G06F 9/30; G06F 7/38; G06F 7/483; G06K 9/6226; G06N 7/005; G06N 3/08; G06N 3/063;

(Continued)

(56) References Cited

U.S. PATENT DOCUMENTS

| | | | | |
|---|---|---|---|---|
| 4,731,864 A | * | 3/1988 | Modla ................. | G09B 9/302 345/428 |
| 2004/0010527 A1 | * | 1/2004 | Lee ....................... | G06F 17/18 708/322 |

(Continued)

OTHER PUBLICATIONS

'Hardware Accelerator Design for Video Segmentation with Multi-modal Background Modelling': Jiang, IEEE, 2005.*

(Continued)

*Primary Examiner* — Li B. Zhen
*Assistant Examiner* — Peter D Coughlan
(74) *Attorney, Agent, or Firm* — Patent Capital Group

(57) ABSTRACT

One factor in limiting the speed of conventional implementations of mixture models is that the algorithm involves many decisions where different operations are fetched and performed depending on the outcome of the decisions. These decisions cause flushing of the pipeline, and thus prevent the realization of a highly parallel pipeline in a processor. Without parallelism, the throughput of the pipeline in the processor, i.e., the ability to process many samples of the digital input at a time, is limited. To alleviate this issue, implementation of the mixture model is reformulated, among other things, by embedding decisions into the process flow as multiplicative factors. The resulting implementation alleviates the need to use if-else statements for the decisions and reduces the number of times the pipeline has to be flushed. The implementation enables a pipeline with a higher degree of parallelism and thereby increases throughput and speed of the implementation.

20 Claims, 6 Drawing Sheets

(58) Field of Classification Search
CPC ..... G10L 15/02; G10L 15/063; G10L 15/083; G10L 19/00; G01C 19/34; G01C 19/44; G01C 21/165; G01S 5/16; H04N 19/13; H03M 7/40; H03M 7/30; H04L 1/00

See application file for complete search history.

(56) References Cited

U.S. PATENT DOCUMENTS

| | | | | |
|---|---|---|---|---|
| 2005/0114103 | A1* | 5/2005 | Han | G06F 17/18 703/2 |
| 2005/0238098 | A1* | 10/2005 | Fandrianto | H04N 7/15 375/240.12 |
| 2008/0040055 | A1* | 2/2008 | Dorsey | G06F 1/28 702/60 |
| 2010/0174540 | A1* | 7/2010 | Seefeldt | H03G 3/3005 704/224 |
| 2010/0214425 | A1* | 8/2010 | Huang | H04N 5/23248 348/208.99 |
| 2011/0145184 | A1* | 6/2011 | You | G10L 15/34 706/52 |
| 2012/0265482 | A1* | 10/2012 | Grokop | G06F 1/1686 702/141 |
| 2013/0163859 | A1* | 6/2013 | Nowozin | G06K 9/6219 382/159 |
| 2013/0243308 | A1* | 9/2013 | Wang | G06T 7/194 382/159 |
| 2013/0243322 | A1* | 9/2013 | Noh | G06K 9/64 382/171 |

OTHER PUBLICATIONS

'A Hardware Architecture for Real-Time Video Segmentation Utilizing Memory Reduction Techniques': Jiang, IEEE, 2009.*
'Become an Xcoder': Altenberg, 2008.*
'FPGA Implementation of Gaussian Mixture Model Algorithm for 47fps Segmentation of 1080p Video': Genovese, 2013, Journal ofElectxical and Computex Enginering vol. 2013, Ai-tide ID 129589.*
'Hardware Accelerator Design for Video Segmentation with Multi-modal Background Modelling': Jianf, 2005, IEEE, 0-7803-8834.*
A Scaleable FIR Filter Implementation Using 32-bit Floating-Point Complex Arithmetic on a FPGA Based Custom Computing Platform: Walters, 1998, Virginia Polytechnic Institute and State University.*
https://www.thefreedictionary.com/Multiplicative+factor.*
'A Framework for High-Level Feedback to Adaptive, Per-Pixel, Mixture-of-Gaussian Background Models': Harville, 2002, SPringer-Verlag.*
'Hand Image Segmentation in Video Sequence by GMM: a comparative analysis' Ribeiro, 2006, IEEE.*
'Sign-sign algorithm for unbiased IIR filtering in impulsive noise': So, 2004, Electronics Letters May 27, 2004 vol. 40 No. 11.*
'Gaussian Mixture Model Tutorial', gmm-1; Mar. 19, 2014, 'Practical Cryptography'.*
'A Robust Moving Objects Detection Algorithm Based on Gaussian Mixture Model': Xuehua, 2009, International Conference on Information Technology and Computer Science.*
Hongtu Jiang et al., "A Hardware Architecture for Real-Time Video Segmentation Utilizing Memory Reduction Techniques", IEEE Transactions on Circuits and Systems for Video Technology, vol. 19, No. 2, Feb. 2009, pp. 226-236 (11 pages).
Fredrik Kristensen et al., "An Embedded Real-Time Surveillance System: Implementation and Evaluation", Journal of Signal Processing Systems 52, 75-94, 2008 © 2007 Springer Science + Business Media, LLC. Manufactured in the United States. DOI: 10.1007/s11265-007-0100-7, 20 pages.
Mariangela Genovese et al., "FPGA Implementation of Gaussian Mixture Model Algorithm for 47fps Segmentation of 1080p Video", Research Article, Hindawi Publishing Corporation, Journal of Electrical and Computer Engineering, vol. 2013, Article ID 129589, http://dx.doi.org/10.1155/20/3/129589, 8 pages.
Hongtu Jiang et al., "Hardware Accelerator Design for Video Segmentation with Multi-modal Background Modelling", © 2005 IEEE, 0-7803-8834-8/05, pp. 1142-1145 (4 pages).
Vu Pham et al., "GPU Implementation of Extended Gaussian Mixture Model for Background Subtraction", IEEE-RIVF 2010 International Conference on Computing and Telecommunication Technologies, Vietnam National University, Nov. 1-4, 2010. DOI: 10.1109/RIVF.2010.5634007, 5 pages.
T. Bouwmans et al., "Background Modeling using Mixture of Gaussians for Foreground Detection—A Survey", hal-00338206, version 1—Nov. 12, 2008, 19 pages.
Rodriguez-Gomez et al., "FPGA Implementation for Real-Time Background Subtraction Based on Horprasert Model", Sensors 2012, 12, 585-611; doi: 10.3390/s120100585, ISSN 1424-8220, www.mdpi.com/journal/sensors, 27 pages.
Jan Vaněk et al., "Optimization of the Gaussian Mixture Model Evaluation on GPU", 12th Annual Conference of the International Speech Communication Association 2011 (Interspeech 2011). 2011, 4 pages.

* cited by examiner

PIPELINING AND PARALLELISM FOR IMPLEMENTING A MIXTURE MODEL

PRIORITY DATA

This application is a non-provisional of U.S. Provisional Patent Application Ser. No. 62/062,484, filed Oct. 10, 2014 and entitled "PIPELINING FOR IMPLEMENTING A MIXTURE MODEL", which is hereby incorporated by reference in its entirety.

TECHNICAL FIELD OF THE DISCLOSURE

The present invention relates to the field of digital signal processing, in particular to enabling parallel processing of decisions involving a mixture model.

BACKGROUND

Digital signal processing involves techniques for processing digital input to improve or modify the digital input or extract further meaningful information from the digital input. Applications of digital signal processing can be found in many different places. For instance, digital signal processing are employed in audio processing and image processing in a variety of applications such as automotive, consumer electronics, robotics, industry manufacturing and processing, healthcare, and so on.

One useful digital signal processing technique uses a probabilistic model for extracting meaningful input from the digital information. Based on the probabilistic model, an algorithm can infer meaningful information from the digital input. One example of a probabilistic model is a mixture model. Broadly speaking, a mixture model is a probabilistic model for representing the presence of subpopulations within an overall population. The different probability distributions within the mixture model allow samples to be classified as belonging to any one or more of the subpopulations. Furthermore, the mixture model provides a mechanism for updating probability distributions associated with the subpopulations based on the classification. One commonly used mixture model is a Mixture of Gaussians (MOG) model, where the probability distributions are Gaussian distributions.

An exemplary application implementing Mixture of Gaussians includes using the probabilistic model to classify whether a pixel belongs to the foreground or the background. The application can process video frames to determine whether a pixel in a frame belongs to foreground (e.g., moving objects) or to background (e.g., static backgrounds) based on the probability distributions. Unfortunately, conventional implementations of Mixture of Gaussians are computationally intensive and can be slow when computational resources are limited. Thus, conventional implementations are not always suitable for real-time applications such as processing video data captured by a front-end camera of an automobile for driver assistance, processing video data captured by a camera in industrial vision systems, processing audio data captured by a microphone in a robot or portable device, etc.

Overview

One factor in limiting the speed of conventional implementations of mixture models is that the algorithm involves many decisions where different operations are fetched and performed depending on the outcome of the decisions. These decisions cause flushing of the pipeline, and thus prevent the realization of a highly parallel pipeline in a processor. Without parallelism, the throughput of the pipeline in the processor, i.e., the ability to process many samples of the digital input at a time, is limited. To alleviate this issue, implementation of the mixture model is reformulated, among other things, by embedding decisions into the process flow as multiplicative factors. The resulting implementation alleviates the need to use if-else statements for the decisions and reduces the number of times the pipeline has to be flushed. The implementation enables a pipeline with a higher degree of parallelism and thereby increases throughput and speed of the implementation.

BRIEF DESCRIPTION OF THE DRAWING

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Basics of Mixture of Gaussians

Figure 1:
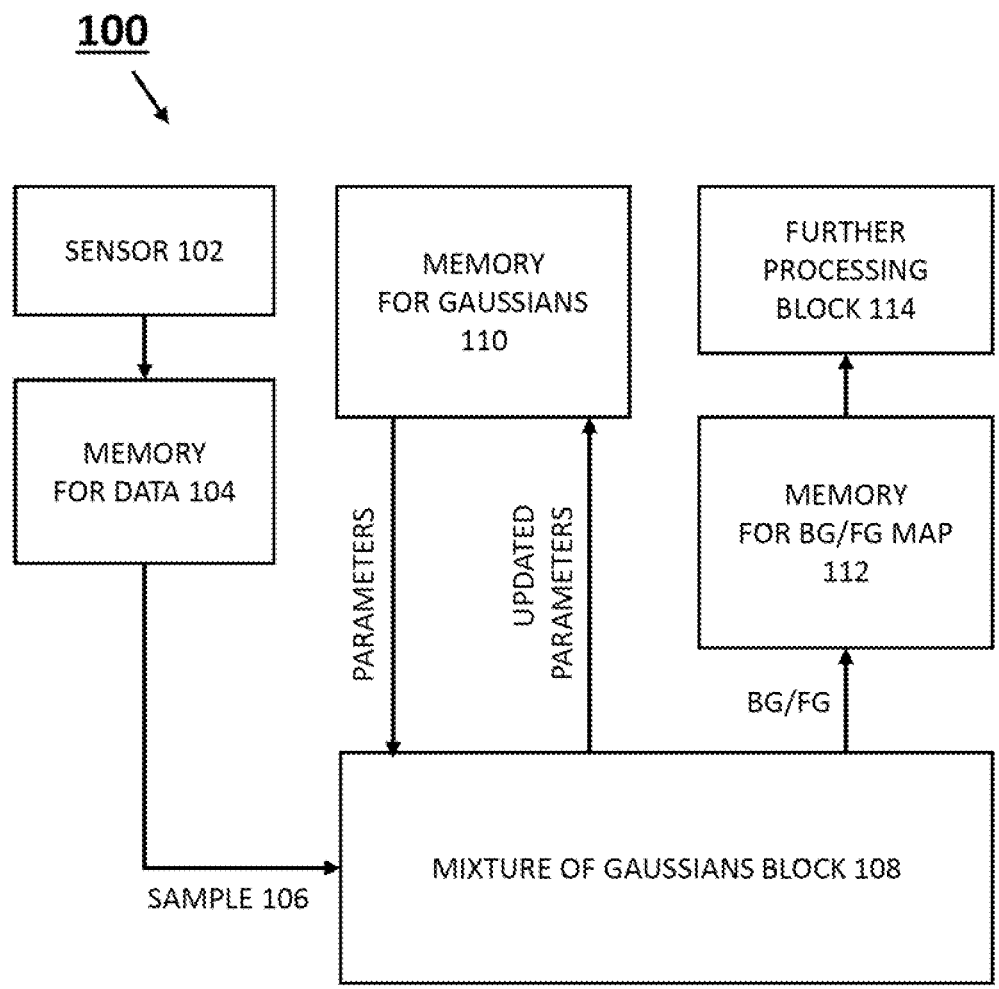
FIG. 1 shows an exemplary system for providing an implementation of Mixture of Gaussians, according to some embodiments of the disclosure.

Mixture of Gaussians (MOG) is one example of a Mixture Model comprising a plurality of probability distributions usable for classifying samples, such as pixel data, audio samples, and data points in a study about a population. The classification can be used in many interesting applications such as computer vision, audio signal processing, artificial intelligence, statistical studies, noise identification/removal, component identification/removal, and so on.

For simplicity, the present disclosure describes an exemplary application of MOG—using MOG to classify pixels as foreground or background. In a pixel-wise MOG approach, the samples being classified by the MOG are pixel values of pixels of video frames (sometimes referred simply as pixels of an image frame in a video). However, it is envisioned by the present disclosure that other suitable data samples can be used as input for an MOG algorithm. For instance, audio samples or features extracted from audio samples can be used as input for an MOG algorithm.

Referring back to pixel-wise MOG, a plurality of probability distributions can be used for modeling background and foreground objects in video frames. In one example, a traffic surveillance system can model background pixels using a mixture of Gaussian probability distributions (or referred simply as "Gaussians"). For instance, the Gaussian probability distributions can correspond to road (background), vehicle (foreground), and shadows (background). In this example, road, vehicle, and shadows are subpopulations of the population, and the Gaussians (i.e., the probability distributions) can have different parameters for modeling those subpopulations based on certain known information about the subpopulations or past classifications of samples.

Broadly speaking, a given pixel of a particular frame can be matched against any one of the Gaussians corresponding to that pixel. If a match is found, the pixel can be classified as the subpopulation corresponding to the Gaussian that produced the match. Because MOG is performed on a pixel by pixel basis, when there are K Gaussians, there can be K Gaussians per pixel. Depending on whether the pixel matches a particular Gaussian, the parameter(s) of the matching Gaussian are updated to reflect the new information gained from the classification. Also, the parameter(s) of the non-matching Gaussians are updated to reflect the new information gained from the classification. Accordingly, the initial Gaussians can learn from past classifications to continually update the probability distributions, where the updated probability distributions can be used for the pixel (having the same index) in the next frame.

Gaussian parameters differ for each Gaussian and the parameters differ for each pixel. Moreover, the Gaussian parameters change for every frame of the video sequence due to the updating of the parameters. The same procedure for matching and updating is applied to K Gaussians for all pixels of the frame for many frames. As a result, the algorithm can be computationally intensive, both in processing times and memory access times.

Exemplary MOG System

FIG. 1 shows an exemplary system for providing an implementation of Mixture of Gaussians, according to some embodiments of the disclosure. The system 100 includes sensor 102, e.g., an image sensor, for generating digital input data. In the case of pixel-wise MOG, the digital input data include pixel values of pixels of image frames of a video. Optionally, the digital input data are stored in (computer-readable non-transitory) memory for data 104, such as a data buffer, or on-chip memory of a digital signal processor. If desired, the digital input data stored in 104 can be processed to generate a sample 106 (e.g., by filtering, transforming RGB values to grayscale, or performing a suitable feature extraction transformation). In some cases, the digital input data is not processed but used directly as sample 106.

For pixel-wise MOG, an example of sample 106 comprises one or more pixel values of a pixel of an image frame of a video (e.g., RGB value, grayscale value, intensity value, etc.). Accordingly, sample 106 can be represented by $X_{p,t}$, defined by two indexes p and t. The index p can be the index for the sample as a pixel (e.g., for an image frame having 1024 pixels, the index p can have a value from 1 to 1024). The index t is for the frame, or for time. The sample 106 is provided as input to the Mixture of Gaussians (MOG) block 108 as input for processing. Many samples including sample 106 can be provided to MOG block 108. For instance, many pixel values for many pixels can be provided to MOG block 108. MOG block 108 can include specially provisioned hardware computation blocks for carrying out functions related to MOG. In some cases, MOG block 108 include hardware computation blocks available in a digital signal processor for carrying out functions related to MOG. In some cases, the MOG block 108 is operable to carry out the functions related to MOG in response to low-level hardware instructions from a library stored in an instruction memory of the system 100.

Gaussian probability distributions in MOG are specified by three parameters: weight w, mean μ, and variance $\sigma^2$. Because the parameters differ for each pixel and change for every frame, the parameters for the Gaussians are defined by three indexes p, k, and t. The index p can be the index for the sample as a pixel. The index k is the index of the Gaussian probability distribution (e.g., for K Gaussians, the index k can have a value from 1 to K). The index t is for the frame, or for time. The parameters for the Gaussians are stored in (computer-readable non-transitory) memory for Gaussians 110. These parameters are used by MOG block 108 for matching sample 106 against the mixture of Gaussians and sorting of the Gaussians. The MOG block 108 fetches the parameters of the mixture of Gaussians corresponding to the sample. Based on whether the sample 106 matches the individual Gaussian probability distributions or not, parameter(s) of the individual mixture of Gaussians are updated accordingly. The updated parameters are computed and stored back in memory for Gaussians 110.

Based on the result of the matching of the sample 106 against the Gaussians, MOG block 108 can also map the sample 106 as any one or more of the subpopulations of the population. In this case, MOG block 108 can map the sample 106 as background or foreground depending on the result. The MOG block 108 can provide the mapping (shown as "BG/FG") to a (computer-readable non-transitory) memory for background/foreground (BG/FG) map 112. Many mappings can be produced for many samples and many frames, thus producing the BG/FG maps for many frames. A further processing block 114 can be included in system 100 to process the BG/FG maps, e.g., render the maps for display or provide the maps to an algorithm to further extract information from the maps. For instance, an algorithm can be used to track movement or displacement of moving foreground objects in the video based on the BG/FG maps.

An Overview MOG Procedure

Figure 2:
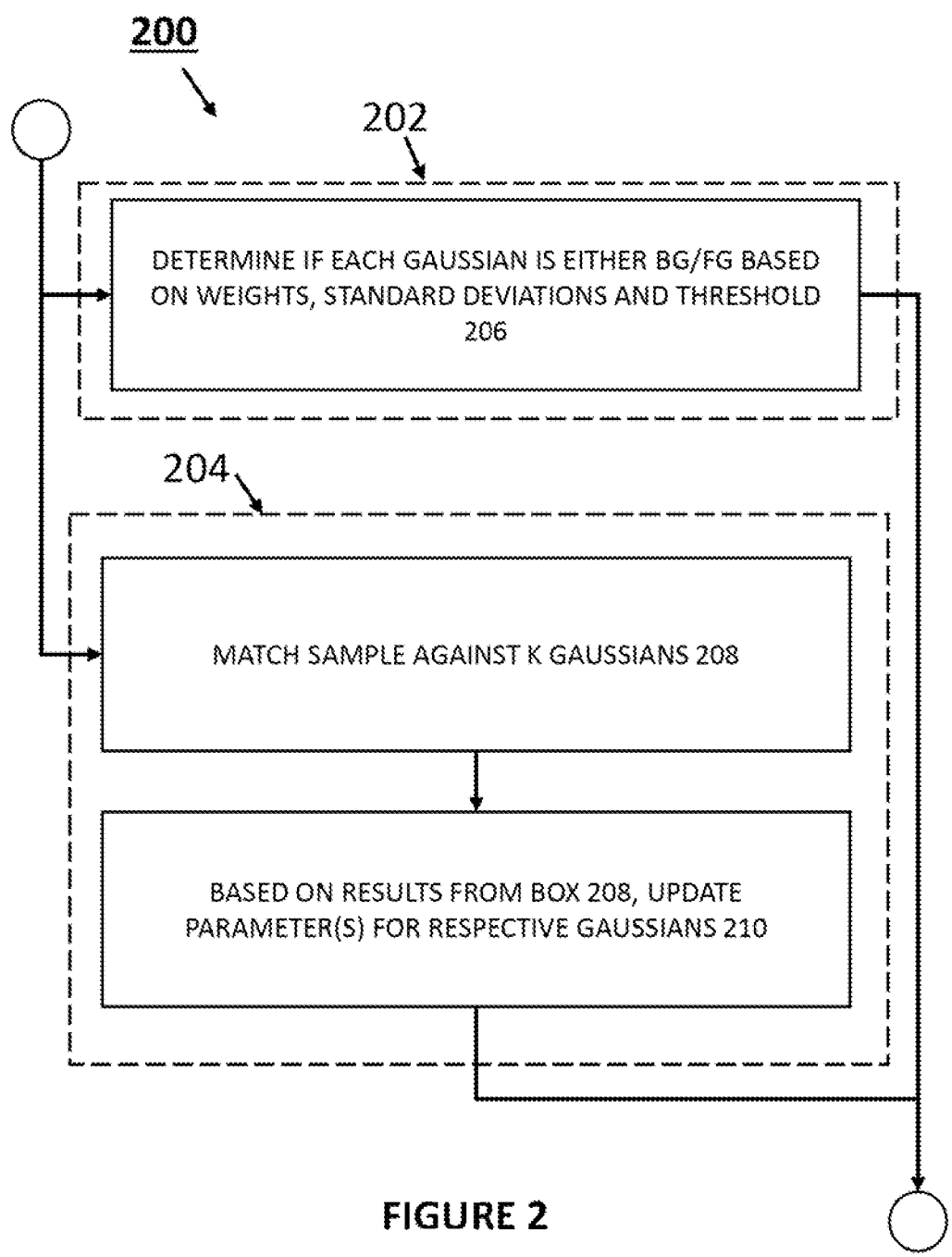
FIG. 2 shows a flow diagram illustrating the procedure for Mixture of Gaussians for background/foreground detection.

FIG. 2 shows a flow diagram illustrating the procedure for Mixture of Gaussians for background/foreground detection. The procedure 200 for MOG has, among other things, two main processes, process 202 and process 204; the procedure 200 is performed for every pixel of an image frame in the same manner. Process 202 relates to deciding which Gaussian(s) is associated with the background and which Gaussian(s) is associated with the foreground. Process 204 relates to matching a sample against the mixture of Gaussians and updating of the Gaussian parameters. When the two processes are combined, MOG can determine whether the sample $X_{p,t}$ is likely to belong or belongs to the background or to the foreground. For this example, there are K Gaussians for each pixel for each frame with corresponding parameters: weight $w_{p,k,t}$, mean $\mu_{p,k,t}$, and variance $\sigma^2_{p,k,t}$. For ease of understanding, the index p is omitted because the same operations are repeated for many samples, e.g., every pixel of an image frame.

Referring to process 202, an MOG block decides if each Gaussian is associated with either the background or the foreground based on weights and standard deviations corresponding to the Gaussians and a threshold $T_{BG}$ (box 206). In the example of pixel-wise MOG, the processor sorts the K Gaussians based on a ratio $r_{k,t}=w_{k,t}/\sigma_{k,t}$, where the K sorted Gaussians begins with the Gaussian having the highest ratio $r_{k,t}$. The sorting based on the ratio suppose that a background pixel corresponds to a high weight $w_{k,t}$ with a weak variance/standard deviation $\sigma_{k,t}$ due to a background is more present than moving objects of the foreground and its value is more or less constant. The first B Gaussian probability distributions which exceeds a certain predefined threshold $T_{BG}$ is determine as being associated with the background, and the other distributions are determined as being associated with the foreground. Mathematically, the B Gaussian probability distribution can be expressed as:

$$B = \underset{b}{\arg\min}\left(\sum_{k=1}^{b} w_{k,t} > T_{BG}\right)$$

The above equation adds in succession the weights of first b Gaussians of the K sorted Gaussians distributions, until the sum is greater than the threshold $T_{BG}$ (usually a predefined threshold value belonging to the [0, 1] interval.

Referring to process 204, the procedure performs steps associated with matching of a sample against the K Gaussians and the updating of the K Gaussians based on the results from the matching. At box 208, a sample is matched against up to K Gaussians, and the matching can be performed against the K Gaussians. The matching can involve computing a distance of the sample $X_t$ from the mean $\mu_{k,t}$ (e.g., a Mahalanobis distance or a variation thereof) and determining whether the distance is less than a distance threshold defined based on a multiple of the standard deviation $\sigma_{p,k,t}$ (e.g., $T_D * \sigma_{p,k,t}$). If the distance is less than the distance threshold ("the match condition"), then it is determined that the sample matches the particular Gaussian ("the matched Gaussian" or "the matching Gaussian"). In some cases, the matching is performed against the K sorted Gaussians (beginning with the Gaussian having the highest ratio $r_{k,t}$ (one by one Gaussian), and the first Gaussian meeting the match condition (i.e., the Gaussian having the highest ratio while satisfying the match condition) is considered to be the matched Gaussian. The other Gaussians ("the non-matched Gaussians" or "the non-matching Gaussian") are determined as non-matching.

Combining the two processes 202 and 204 together, the sample can be classified as a background sample or a foreground sample. Referring back to process 202, the set of Gaussians B represents the background. Referring back to process 204, the sample is matched against the K Gaussians. Accordingly, a sample which matches one of the Gaussians in the set of Gaussians B is thus classified as a background sample. Conversely, a sample which matches one of the Gaussians not in the set can be thus classified as a foreground sample. If the sample does not match any of the K Gaussians, then the sample is classified as a foreground sample.

Before moving onto the next frame or time t+1, the parameters of the K Gaussians are updated for respective Gaussians based on whether a respective Gaussian is a matched Gaussian or a non-matched Gaussian (box 210). Broadly speaking, several cases ("control points") dictate the updating of the parameters, each case determining how the parameters should be updated.

In a first case, a match is found with one of the K Gaussians. For the matched Gaussian, the update can be performed according to a predefined learning rate $\alpha$ and $\rho$. For example, $\rho = \alpha \cdot \eta(X_{t+1}, \mu_{k,t}, \Sigma_{k,t})$ where $\eta(X,\mu,\Sigma)$ is a Gaussian probability density function (having a suitable form known in the art or some other form of probability density function), and $\Sigma_{k,t}$ is a covariance matrix (in some cases taking the form $\Sigma_{k,t} = \sigma_{k,t}^2 I$). For this first case, the weight $w_{k,t+1}$, mean $\mu_{k,t+1}$, and variance $\sigma^2_{k,t+1}$ for the matched Gaussian can be updated according to the following equations:

$$w_{k,t+1} = (1-\alpha)w_{k,t} + \alpha$$

$$\mu_{k,t+1} = (1-\rho)\mu_{k,t} + \rho \cdot X_{t+1}$$

$$\sigma_{k,t+1}^2 = (1-\rho)\sigma_{k,t}^2 + \rho(X_{t+1}-\mu_{k,t+1}) \cdot (X_{t+1}-\mu_{k,t+1})^T$$

Also for this first case, the mean $\mu_{k,t+1}$, and variance $\sigma^2_{k,t+1}$ for the non-matched Gaussian is unchanged while the weight $w_{k,t+1}$, for the non-matched Gaussian can be updated according to the following equation:

$$w_{k,t+1} = (1-\alpha)w_{k,t}$$

In a second case, no match is found with any of the K Gaussians. In this case, the parameters of the least probable Gaussian can be updated according to the following equations:

$$w_{k,t+1} = \text{low prior weight}$$

$$\mu_{k,t+1} = X_{t+1}$$

$$\sigma_{k,t+1}^2 = \text{large initial variance}$$

Inefficiencies of MOG Due to If-Else Statements

Usually, the implementation of the parameter update process of the box 210 is provided using many if-else statements. The if-else statement would check whether the sample matches a given Gaussian, then the procedures breaks and implements a particular update procedure based on whether the sample matches a given Gaussian. This is one of the pain points for implementing MOG efficiently in hardware because a highly parallel pipeline cannot be realized when the if-else statements (i.e., branch instructions) are causing many flushes of the pipeline.

Figure 3:
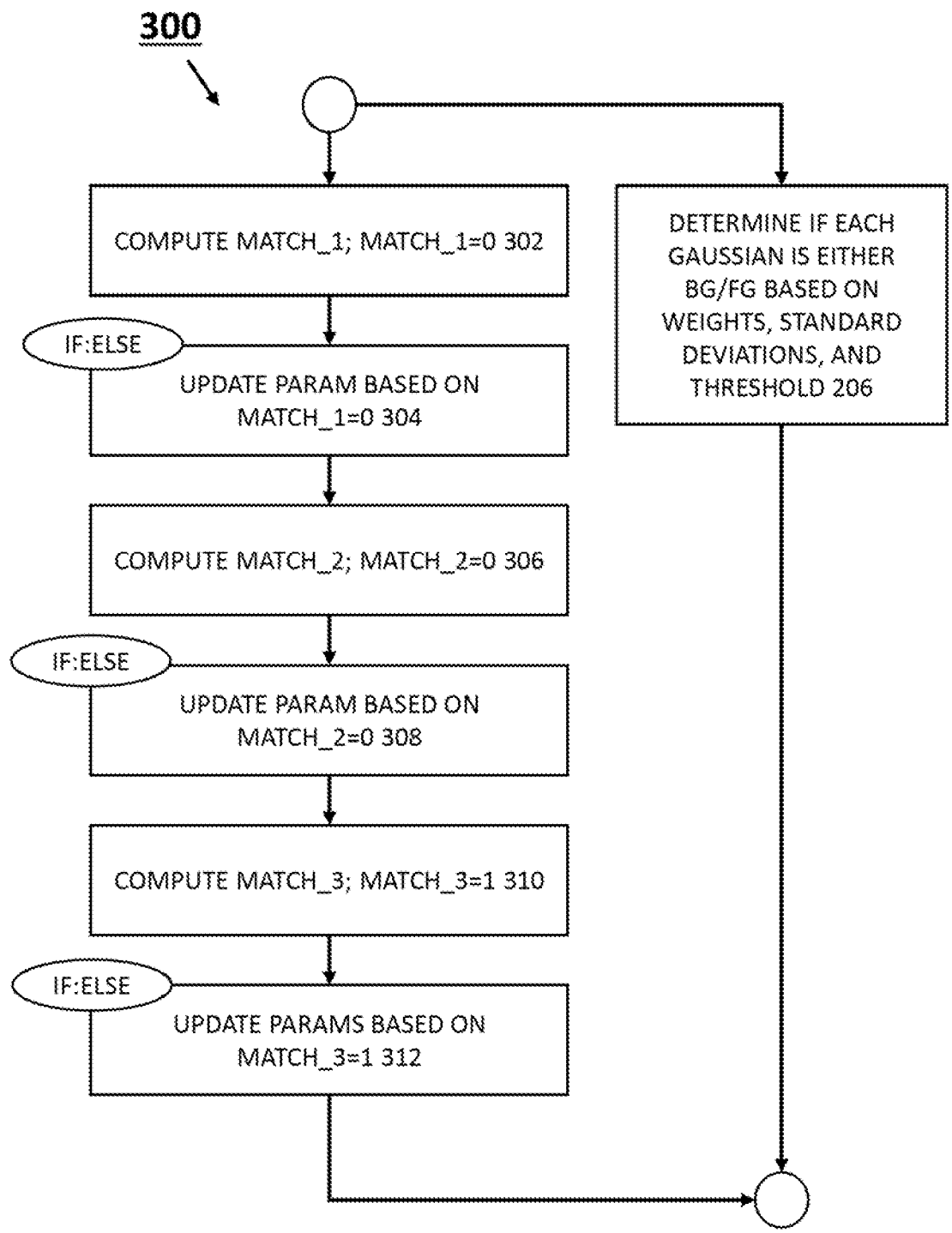
FIG. 3 shows an example of process flow for Mixture of Gaussians having a low degree of parallelism.

FIG. 3 shows an example of process flow for Mixture of Gaussians having a low degree of parallelism. In particular, the example process flow 300 shows the many if-else statements used for implementing process 204 of FIG. 2 for a given sample against a mixture of Gaussians. At box 302, the sample is matched against a first Gaussian, and the result MATCH_1 is computed for the first Gaussian. In this example, the first Gaussian is a non-matching Gaussian, and thus MATCH_1=0. Using if-else statements, at box 304, the weight parameter for the first Gaussian is updated according to MATCH_1=0. At box 306, the same sample is matched against a second Gaussian, and the result MATCH_2 is computed for the second Gaussian. In this example, the second Gaussian is a non-matching Gaussian, and thus MATCH_2=0. Using if-else statements, at box 308, the weight parameter for the second Gaussian is updated according to MATCH_2=0. At box 310, the same sample is matched against a third Gaussian, and the result MATCH_3 is computed for the third Gaussian. In this example, the third Gaussian is a matching Gaussian, and thus MATCH_3=0. Using if-else statements, at box 310, the weight, mean, and variance parameters for the second Gaussian is updated according to MATCH_3=1.

Using the implementation illustrated in the process flow 300 in hardware or in software on embedded products, the pipeline can break for every control decision (i.e., the if-else statements). The problem is exacerbated by the fact that many control decisions are made for each sample. For that reason, the implementation shown in FIG. 3 is not very efficient in any pipelined architecture. In some cases, multiple Gaussians or multiple pixels cannot be computed during the same clock cycle (i.e., in parallel). It can be seen from the process flow that all these if-else statements prevent a highly-parallel pipeline from being implemented in the hardware.

Increasing Degree of Parallelism by Embedding Match Decisions as Multiplicative Factors To alleviate the issues described above, an improved implementation of MOG is obviates the need to use if-else statements. Instead of using if-else statements, the implementation of MOG embeds the if-else statements (i.e., the control decisions) as multiplicative factors used in updating the parameters. Using appropriate algebraic formulations, the multiplicative factors can cause the parameters to be updated appropriately without having to use if-else statements. By avoiding the use of if-else statements, the control decisions can effectively be pipelined more efficiently with a high degree of parallelism without branching. The resulting pipeline makes it easier to implement a higher level of parallel processing by multiple hardware computation blocks during the same clock cycle and thus significantly increasing the throughput of the computing system.

Looking at one example relating to the updating of the weight w parameter of a Gaussian, it can be seen that the decision can be formulated as a multiplicative factor and embedded in the update of the parameter.

For a matched Gaussian, the weight w is updated according to the following first equation:

$$w_{k,t+1}=(1-\alpha)w_{k,t}+\alpha$$

For a non-matched Gaussian, the weight w is updated according to the following second equation:

$$w_{k,t+1}=(1-\alpha)w_{k,t}$$

Suppose whether the Gaussian is a matched Gaussian or a non-matched Gaussian can be represented using a decision variable $M_k$ where $M_k=1$ if the Gaussian is a matched Gaussian, and $M_k=0$ if the Gaussian is a non-matched Gaussian:

$$M_0 = \begin{cases} 1 & \text{if Gaussian is a matching Gaussian} \\ 0 & \text{if Gaussian is a non-Matching Gaussian} \end{cases}$$

Using the decision variable $M_k$, multiplicative factors A0 and A1 can be computed, where:

$$A0=1-\alpha$$

$$A1=M_k$$

Note one or more values for the multiplicative factors can change depending on whether $M_k=1$ or 0. In this case A0 remains the same for both the matching Gaussian and the non-matching Gaussian. However, A1 changes depending on $M_k$. Using these multiplicative factors, the weight parameter can be updated without using an if-else statement. A new formulation for updating the weight parameter can be defined using the multiplicative factors (having the decision variable embedded therein):

$$w_{k,t+1}=A0*w_{k,t}+A1*\alpha$$

Note that when $M_k=1$, $A0=1-\alpha$ and $A1=1$, and thus $w_{k,t+1}=(1-\alpha)w_{k,t}+1*\alpha$. This is equivalent to the first equation for updating the weight w for a matching Gaussian. When $M_k=0$, $A0=1-\alpha$ and $A1=0$, and thus $w_{k,t+1}=(1-\alpha)w_{k,t}$. This is equivalent to the second equation for updating the weight w for a matching Gaussian.

Variations of the above formulation are envisioned by the disclosure, so long as the formulation provides multiplicative factors that would provide the proper terms in the update equations for both the matching Gaussian and the non-matching Gaussian based on the decision variable $M_k$. Other suitable formulations along the spirit of this approach can be applied for other parameters as well.

Using this approach, the decision and the updating of the parameter based on the decision can be effectively implemented without the use of an if-else statement. Without if-else statements, the process for matching against the Gaussians and updating of the Gaussians based on the match can be implemented by hardware computation blocks for a plurality of Gaussians and for a plurality of samples in parallel without breaking the pipeline.

Figure 4:
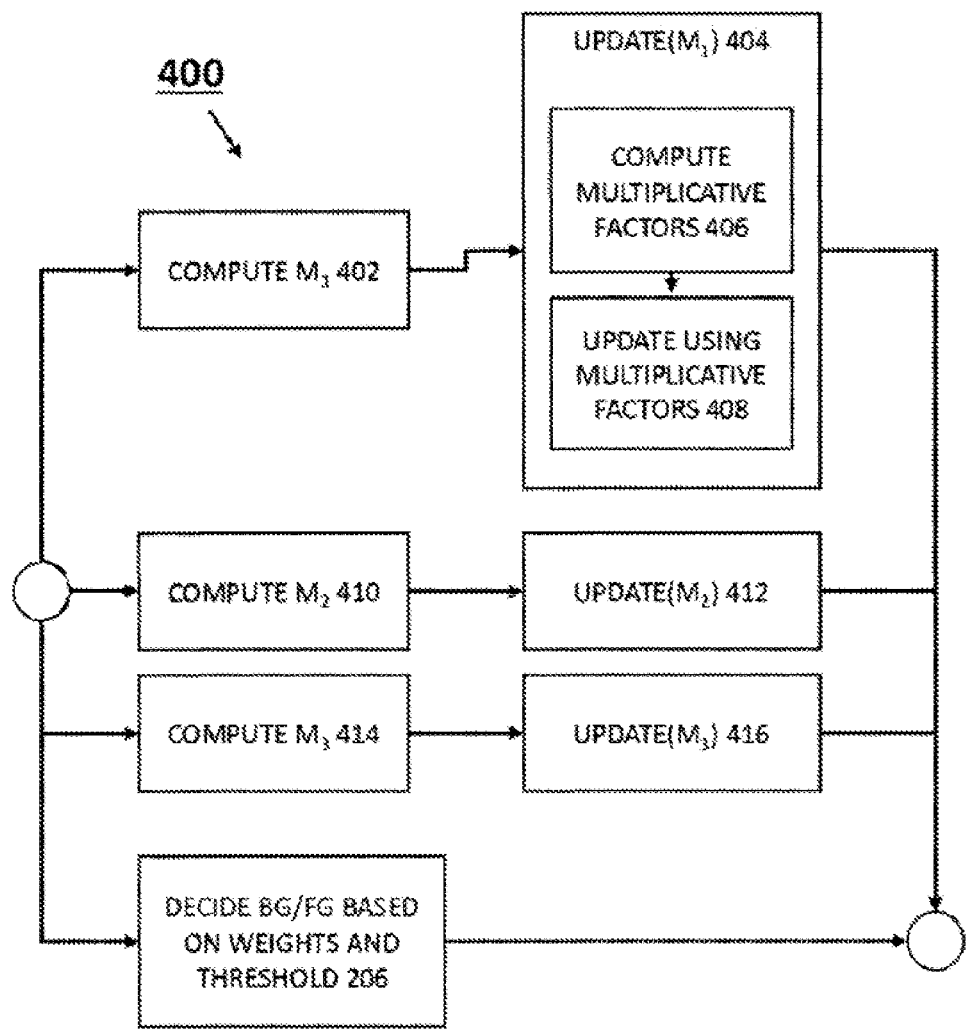
FIG. 4 shows a more efficient process flow for the procedure for Mixture of Gaussians enabling a higher degree of parallel processing for multiple Gaussians, according to some embodiments of the disclosure.

FIG. 4 shows a more efficient process flow for the procedure for Mixture of Gaussians enabling a higher degree of parallel processing for multiple Gaussians, according to some embodiments of the disclosure. It can be seen from process flow 400 that the if-else statements (i.e., branches in the pipeline) are removed, and the computation of the decision variables and the updates of the parameters for multiple Gaussians can be done in parallel. Although not shown, the computation of the decision variables and updates of the parameters of the Gaussians for multiple samples can also be done in parallel.

The process flow 400 of FIG. 4 shows, among other things, steps performed for processing one sample. Note that the operations of the process flow 400 can be repeated for many samples and be performed with a high degree of parallelism in the pipeline. Similar to the procedure 200 of FIG. 2, the process flow 400 includes an operation for deciding whether each Gaussian is associated with either the background or the foreground based on weights and standard deviations corresponding to the Gaussians and a threshold $T_{BG}$ (box 402). This operation may include retaining certain distribution(s) as belonging to the background and certain distribution(s) as belonging to the foreground, and in some cases, include sorting of the Gaussians and normalization of the weights as well. Further to box 402, the process flow 400 includes operations which can be performed in parallel (with each other and with the operation shown in box 402) for enabling a higher degree of parallelism of the pipeline in the hardware.

The process flow 400 illustrates a method for enabling parallel processing of decisions in a processor related to a mixture model, such as MOG (the mixture model would include a plurality of probability distributions, such as a plurality of Gaussians). Specifically, the method can include (1) computing a first decision variable $M_1$ based on a first sample and a first probability distribution corresponding to the first sample (box 402). In other words, the first sample is checked against a first probability distribution (e.g., a first Gaussian) to determine whether it is a match or not, which would result in either $M_1=1$ or 0. This determination can be made based on the distance between the sample and the mean of the first probability distribution and a distance threshold. Once the first decision variable $M_1$ is computed, the method can further include updating parameter(s) for the first probability distribution as a function of the first decision variable $M_1$ (without the use of if-else statements) (box 404). This updating of the parameter(s) can include (2) computing one or more first multiplicative factors based on the first decision variable $M_1$ (box 406). For instance, this operation in box 406 corresponds to computing A0 and A1 according to the above example related to updating the weight w parameter without having to use if-else statements. Then, the method includes (3) updating one or more parameters of the first probability distribution using the one or more first multiplicative factors (box 408). This operation in box 408 corresponds to updating the parameters using the improved formulation $w_{k,t+1}=A0*w_{k,t}+A1*\alpha$ and the multiplicative factor(s) A0 and A1 according to the above example.

The same operations of the process flow 400, operations shown as box 402 and box 404, can be implemented similarly for other Gaussians, as shown in FIG. 4 as box 410 and 412 for a second Gaussian, and box 414 and 416 for a third Gaussian (and so forth if more Gaussians are in the MOG). For instance, the method can further include (4) computing a second decision variable $M_2$ based on the first sample and a second probability distribution corresponding to the first sample (box 410), (5) computing one or more second multiplicative factors based on the second decision variable $M_2$ (box 412), and (6) updating one or more parameters of the second probability distribution using the one or more second multiplicative factors (box 412). Note that any one or more of operations (1) to (3) and any one or more of operations (4) to (6) can be performed during a same clock cycle to provide a higher degree of parallelism. In other words, these operations have the flexibility to be performed during the same clock cycle by multiple hardware blocks processing in parallel.

Although not shown, the operations of the process flow can be implemented similarly for other samples as well. For instance, the method can include (4) computing a third decision variable based on a second sample (different from the first sample) and a third probability distribution corresponding to the second sample, (5) computing one or more third multiplicative factors based on the third decision variable, and (6) updating one or more parameters of the third probability distribution using the one or more third multiplicative factors. Note that any one or more of (1) to (3) and any one or more of (4) to (6) for the second sample can be performed during a same clock cycle. Furthermore, any one or more of (1) to (3), and any one or more of (4) to (6) for the first sample and (4) to (6) for the second sample, can be performed during a same clock cycle. In other words, these operations have the flexibility to be performed during the same clock cycle by multiple hardware blocks processing in parallel.

Using Infinite Input Response (IIR) Filters for Updating Parameters

For MOG, many computations of the algorithm, including the updating of the parameters of the Gaussians, can advantageously be implemented using (recursive) impulse response (IIR) filters having the form $y(n)=a0*y(n-1)+a1*x(n)$..., where a0 and a1 ... are coefficients to the IIR filter. The form of an IIR filter provides a suitable form for implementing the improved formulation for updating the parameters, because the one or more multiplicative factors (e.g., A0 and A1) can be used as coefficients of the IIR filter (e.g., a0 and a1).

Using IIR filters to perform these operations not only removes the use of jumps at control points if the improved formulation embedding decisions in multiplicative factors is implemented, using IIR filters lends itself to an efficient implementation in many hardware architectures. Hardware architectures for digital signal processing often include many available hardware computation blocks capable for providing a plurality of IIR filters being executed in parallel. Exemplary hardware architectures include as Single Instruction Multiple Data (SIMD) architectures where multiple data can be computed in the same cycle, or other suitable digital signal processing architectures that have parallel computation units.

Hardware Computation Blocks for Processing a Sample

Figure 5:
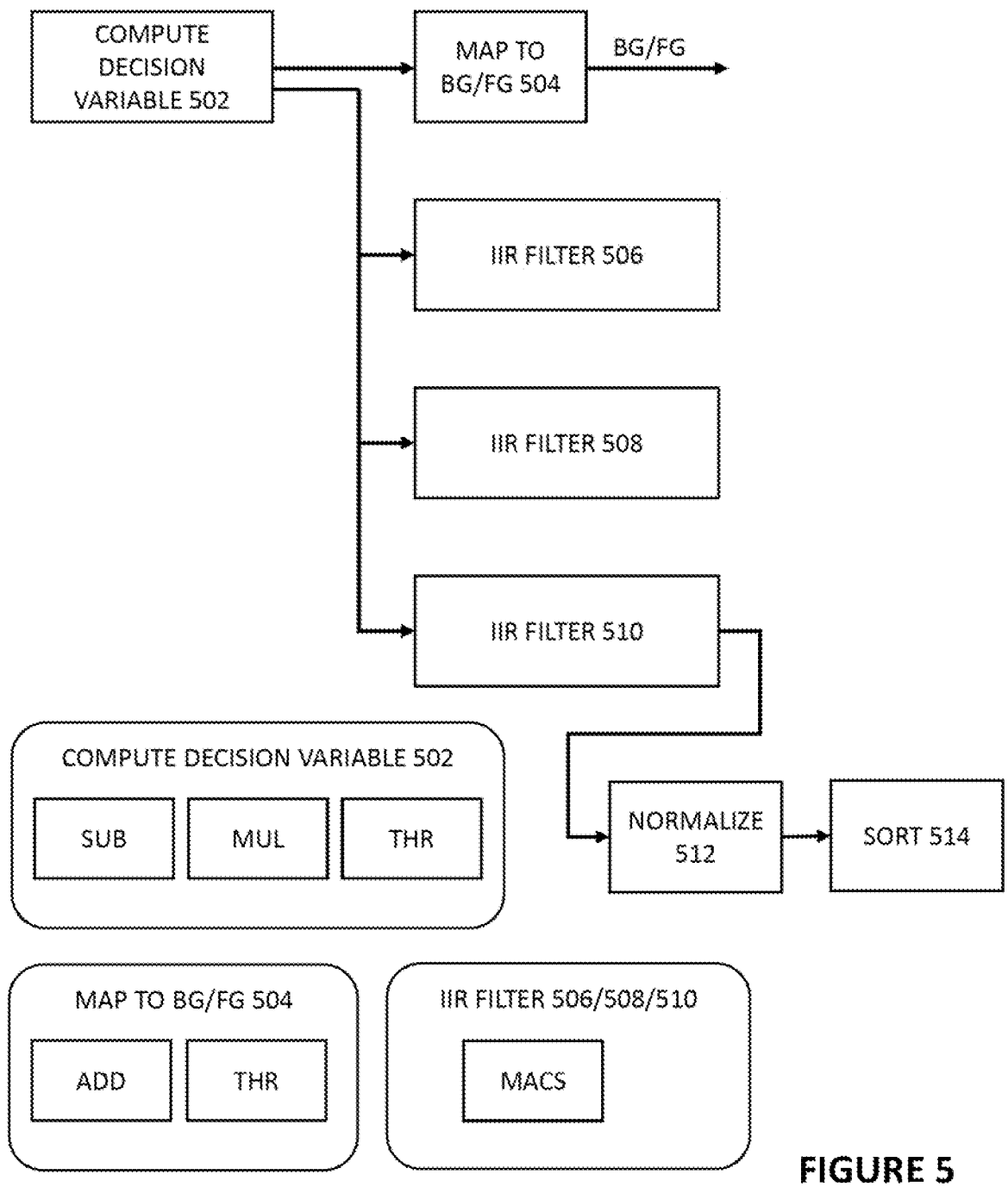
FIG. 5 shows exemplary hardware computation blocks for implementing the procedure for Mixture of Gaussians enabling a higher degree of parallel processing, according to some embodiments of the disclosure.

FIG. 5 shows exemplary hardware computation blocks for implementing the procedure for Mixture of Gaussians enabling a higher degree of parallel processing, according to some embodiments of the disclosure. The flow shown in the FIG. 5 can be used per Gaussian per sample. Specifically, the flow includes a compute decision variable ($M_k$) operation 502 for matching a sample against a particular Gaussian. In some embodiments, the compute decision variable ($M_k$) operation 502 can be implemented using subtraction hardware computation blocks (SUB), multiplication hardware computation blocks (MUL), and thresholding hardware computation blocks (THR). An illustration of the compute decision variable ($M_k$) operation 502 mapped to specific hardware computation blocks is shown in further detail in FIG. 6.

The flow further includes a map to BG/FG operation 504 which decides whether a particular Gaussian belongs to the background or foreground, and also outputs a background/foreground determination (shown as BG/FG) based on whether the particular Gaussian is a matching Gaussian (i.e., based on the decision variable ($M_k$)). The map to BG/FG operation 504 can be implemented using addition hardware computation blocks (ADD) and thresholding hardware computation blocks (THR). For instance, the summation for retaining B distributions as background distributions and comparison of the sums against the threshold $T_{BG}$ can be implemented in hardware using addition blocks, and thresholding blocks.

The flow further includes IIR filters 506, 508, and 510, which updates the parameters weight $w_{k,t}$, mean $\mu_{k,t}$, and variance $\sigma_{k,t}^2$ (respectively) for the particular Gaussian. The IIR filters can be provided using one or more multiplier-accumulator blocks (MACS). For instance, the multiplier-accumulator blocks can update the parameters using the multiplicative factors computed from the decision variable.

The flow can further include a normalize operation 512 which normalizes the weight parameter for a particular Gaussian based on the sum of all weights corresponding to the K Gaussians for the particular sample. The normalize operation 512 can be implemented using addition hardware computation blocks and division hardware computation blocks. Moreover, the flow can further include a sort operation 514 for sorting the K Gaussians according to a sorting criteria, such as the ratio between the weight and standard deviation of a particular Gaussian. An efficient hardware implementation for the sort operation 514 can include sort and swap to pairwise rearrange the Gaussians according to the sorting criteria (e.g., where the ratios are ordered in a descending order).

Optimization for Computing Matches Against Gaussians

Many digital signal processor architectures do not allow many parallel comparison hardware computation blocks to be used in parallel due to the lack of comparison hardware computation blocks. For that reason, performing many comparisons can come at a cost of many clock cycles without the advantage of parallelism in the hardware. This can be one pain point for having a highly parallel implementation of MOG in a digital signal processor. To address this issue, the MOG algorithm can be optimized by using a subtraction hardware computation block and an extraction of a sign bit to provide the same functionality of a comparison hardware computation block. In other words, computing the first decision variable using subtraction and using a sign bit of the result from the subtraction as the first decision variable (negative values have a sign bit of 1, and positive values have a sign bit of 0). Subtraction hardware computation blocks are much more readily available in a digital signal processor than comparison hardware computation blocks, and many of the subtraction hardware computation blocks can be used in parallel. The extraction of a sign bit of the result can also be performed for many Gaussians and samples in parallel without incurring extra clock cycles.

Figure 6:
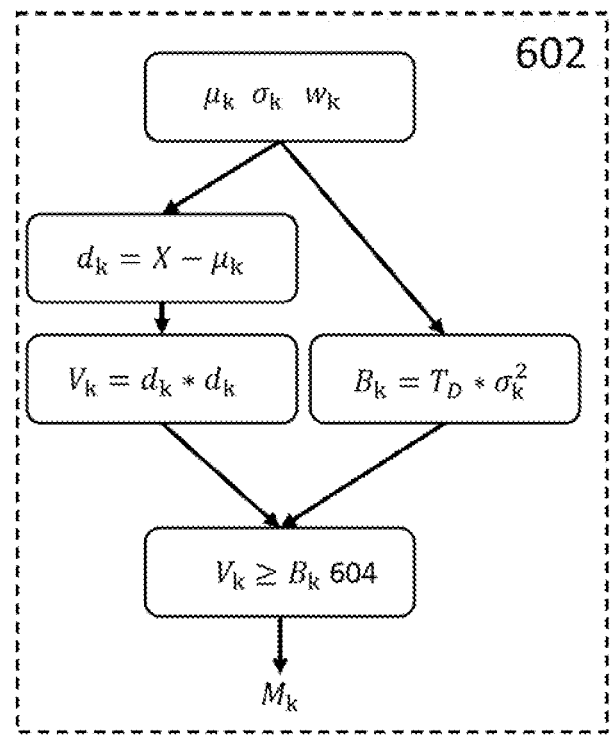
FIG. 6 illustrates computations and hardware computation blocks for generating decision variables, according to some embodiments of the disclosure.
Figure 6:
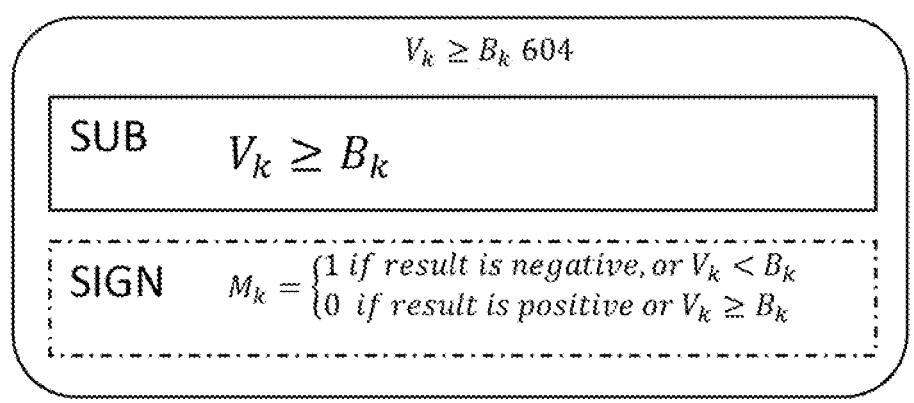

FIG. 6 illustrates computations and hardware computation blocks for generating decision variables which leverages subtraction and extraction of the sign bit of the result from the subtraction (instead of using a comparison block), according to some embodiments of the disclosure. In the example shown, the process flow 602, determining whether a sample matches a particular Gaussian involves a comparison between two variables: one first variable (shown as $V_k$ in process flow 602) relating to the sample's distance from the mean of a Gaussian, and another variable relating to the standard deviation (shown as $B_k$ in process flow 602 (referred herein as the "distance threshold")). Recall that the matching of a sample against a Gaussian involves comparing the first variable and the second variable (shown as $V_k \geq B_k$ in part 604 of the process flow 602). If the first variable relating to the distance is less than the second variable relating to distance threshold, then it is determined that the sample matches the particular Gaussian. Instead of using a comparison block for comparing $V_k$ against $B_k$ to determine whether $V_k \geq B_k$ is true or not true to compute the match decision variable $M_k$, a subtraction of $V_k \geq B_k$ and the sign bit can be used as the match decision variable $M_k$, where:

$$M_k = \begin{cases} 1 & \text{if result is negative, or } V_k < B_k \\ 0 & \text{if result is positive or } V_k \geq B_k \end{cases}$$

Variations and Implementations

The MOG procedure described herein relates to some specific implementations which are not intended to be limiting to the disclosure, as one skilled in the art would appreciate that the implementations can vary without departing from the spirit of the invention. While the examples herein relates to providing pixel-wise MOG model, the present disclosure of an improved implementation for MOG can be applicable to other MOG models for audio signal processing, statistical analyses, artificial intelligence, and any suitable digital signal processing algorithm where classification of subpopulation within a population is performed. In particular, the improved implementation disclosed herein is particularly suitable in real-time applications or applications where computational time While the examples herein are described in relation to Mixture of Gaussians, other mixture models (involving other types of probability distributions) or probabilistic models involving many decisions to classify data samples can also leverage the spirit of the improved implementations to increase the degree of parallelism. Moreover, it should be noted that the use of complementary electronic devices, hardware, software, etc. offer an equally viable option for implementing the teachings of the present disclosure.

Note that the activities discussed above with reference to the FIGURES are applicable to any integrated circuits or specialized processors that involve signal processing, particularly those that can execute specialized software programs, or algorithms, some of which may be associated with processing digitized real-time data according to a mixture model. Certain embodiments can relate to multi-DSP signal processing, floating point processing, signal/control processing, fixed-function processing, microcontroller applications, etc. In certain contexts, the features discussed herein can be applicable to computer vision systems, artificial intelligence, medical systems, scientific instrumentation, wireless and wired communications, radar, industrial process control, audio and video equipment, current sensing, instrumentation, and other digital signal processing-based systems. Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Yet other consumer applications can involve advanced computer vision or audio processing in devices such as smartphones, wearables, tablets, security systems, PCs, gaming technologies, augmented reality, virtual reality, simulation training, etc.

Parts of various hardware computation blocks for implementing a highly parallel pipeline for MOG can include electronic circuitry in one or more hardware processors to perform the functions described herein. In some cases, the processor can be specially configured with the described hardware computation blocks to carrying out the process flows described herein. For instance, the processor may include one or more application specific components, or may include programmable logic gates which are configured to carry out the functions describe herein. The circuitry can operate in analog domain, digital domain, or in a mixed signal domain. In some instances, the processor may be configured to carrying out the functions described with the process flows described herein by executing one or more instructions stored on a non-transitory computer medium.

In one example embodiment, any number of hardware computation blocks of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system (such as sensors and memory components) can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc., for carrying the functions associated with MOG. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the hardware computation blocks of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the MOG functionalities and associated hardware blocks may be implemented in one or more silicon cores in Application Specific Integrated Circuits (ASICs), Field Programmable Gate Arrays (FPGAs), and other semiconductor chips.

It is also imperative to note that the details of implementing MOG outlined herein (e.g., the number of operations, hardware computation blocks, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more hardware computation blocks (comprising of circuitry arranged to implement certain functions). However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to MOG, illustrate only some of the possible functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

What is claimed is:

1. A method for performing parallel and pipelined processing for a mixture model in a processor and alleviating a need to use if-else statements to implement control decisions of the mixture model, comprising:

executing first operations for a sample and a first probability distribution of the mixture model, wherein the first operations comprise:

extracting a value of a sign bit from a signed binary value, the signed binary value produced by subtraction of a first variable related to a standard deviation of the first probability distribution of the mixture model from a second variable relating to a distance of the sample from a mean of the first probability distribution;

determining, by the processor, whether the sample matches the first probability distribution based on the value of the sign bit;

determining, by the processor, values of one or more multiplicative factors based on the value of the sign bit; and updating, by the processor, at least one parameter of the first probability distribution, wherein updating the at least one parameter of the first probability distribution includes utilizing an infinite impulse response filter with the values of the one or more multiplicative factors as coefficients of the infinite impulse response filter to update the at least one parameter of the first probability distribution; and executing second operations for the sample and a second probability distribution of the mixture model;

wherein two or more operations of the first operations and the second operations are executed during a same clock cycle by the processor.

2. The method of claim 1, wherein the values of the one or more multiplicative factors are first values of the one or more multiplicative factors, and wherein the second operations comprise:

determining, by the processor, whether the sample matches the second probability distribution of the mixture model;

determining, by the processor, second values of one or more multiplicative factors based on whether the sample matches the second probability distribution of the mixture model; and updating, by the processor, at least one parameter of the second probability distribution, wherein updating the at least one parameter of the second probability distribution includes utilizing a second infinite impulse response filter with the second values of the one or more multiplicative factors as coefficients of the infinite impulse response filter to update the at least one parameter of the second probability distribution.

3. The method of claim 2, wherein:

determining whether the sample matches the first probability distribution or updating the at least one parameter of the first probability distribution is performed during a same clock cycle of the processor as determining whether the sample matches the second probability distribution or updating the at least one parameter of the second probability distribution.

4. The method of claim 1, wherein:

determining whether the sample matches the first probability distribution or updating the at least one parameter of the first probability distribution is performed during a same clock cycle of the processor as determining, by the processor, whether a second sample matches the second probability distribution or updating, by the processor, at least one parameter of the second probability distribution.

5. The method of claim 1, wherein:

determining whether the sample matches the first probability distribution includes determining whether the value of the sign bit indicates that the second variable is larger than the first variable.

6. The method of claim 1, wherein the infinite impulse response filter is implemented via one or more multiplier-accumulator blocks of the processor.

7. The method of claim 1, wherein determining whether the sample matches the first probability distribution includes determining that the sample matches the first probability distribution in response to the value of the sign bit indicating that the second variable is smaller than the first variable or determining that the sample does not match the first probability distribution in response to the value of the sign bit indicating that the second variable is larger than the first variable.

8. The method of claim 1, wherein:

the mixture model comprises a Mixture of Gaussians model;

the Mixture of Gaussians model comprises a plurality of Gaussians probability distributions;

the plurality of Gaussians probability distributions includes the first probability distribution and the second probability distribution; and the at least one parameter is a weight parameter, a mean parameter, or a variance parameter of the first probability distribution.

9. The method of claim 1, wherein:

the sample comprises one or more pixel values of a pixel of an image frame of a video; and determining whether the sample matches the first probability distribution comprises determining whether the pixel of the image frame of the video belongs to a foreground or a background.

10. The method of claim 1, wherein determining the values of the one or more multiplicative factors based on the value of the sign bit comprises setting a value of a first multiplicative factor of the one or more multiplicative factors to be equal to the value of the sign bit.

11. A computer-readable non-transitory medium comprising one or more instructions for parallel and pipelined processing for a mixture model and alleviating a need to use if-else statements to implement control decisions of the mixture model, wherein, when the one or more instructions are executed by a processor, the one or more instructions configure the processor to:

execute first operations for a sample and a first probability distribution of the mixture model, wherein the first operations comprise:

extracting a value of a sign bit from a signed binary value, the signed binary value produced by subtraction of a first variable related to a standard deviation of the first probability distribution of the mixture model from a second variable relating to a distance of the sample from a mean of the mixture model;

determining whether the sample matches the first probability distribution based on the value of the sign bit;

determining values of one or more multiplicative factors based on the value of the sign bit; and updating at least one parameter of the first probability distribution, wherein updating the at least one parameter of the first probability distribution includes utilizing an infinite impulse response filter with the values of the one or more multiplicative factors as coefficients of the infinite impulse response filter to update the at least one parameter of the first probability distribution; and execute second operations for the sample and a second probability distribution of the mixture model;

wherein two or more operations of the first operations and the second operations are executed during a same clock cycle by the processor.

12. The computer-readable non-transitory medium of claim 11, wherein the second operations comprise:

determining whether the sample matches the second probability distribution of the mixture model; and updating at least one parameter of the second probability distribution based on whether the sample matches the second probability distribution.

13. The computer-readable non-transitory medium of claim 12, wherein:

the one or more instructions configure the processor to determine whether the sample matches the first probability distribution or update the at least one parameter of the first probability distribution during a same clock cycle of the processor as determination of whether the sample matches the second probability distribution or updating of the at least one parameter of the second probability distribution.

14. The computer-readable non-transitory medium of claim 11, wherein the one or more instructions configure the processor to:

determine whether the sample matches the first probability distribution or update the at least one parameter of the first probability distribution during a same clock cycle of the processor as a determination of whether a second sample matches the second probability distribution or an update of at least one parameter of the second probability distribution.

15. The computer-readable non-transitory medium of claim 11, wherein the infinite impulse response filter is implemented via a multiplier-accumulator block of the processor.

16. The computer-readable non-transitory medium of claim 11, wherein to determine whether the sample matches the first probability distribution comprises:
   determining whether the value of the sign bit indicates that second variable is larger than the first variable.

17. The computer-readable non-transitory medium of claim 11, wherein the one or more instructions further configure the processor to:
   cause a subtraction hardware computation block to subtract the first variable from the second variable to produce the signed binary value.

18. A digital signal processor for parallel and pipelined processing for a mixture model and alleviating a need to use if-else statements to implement control decisions of the mixture model, the digital signal processor comprising:
   a plurality of hardware computation blocks comprising one or more subtraction hardware computation blocks and one or more multiplier-accumulator blocks; and
   memory having instructions stored thereon, the instructions for processing samples based on the mixture model, wherein the instructions cause the digital signal processor to:
      execute first operations for a first sample and a first probability distribution of the mixture model, wherein the first operations comprise:
         producing, using the one or more subtraction hardware computation blocks, a signed binary value that indicates whether the first sample matches the first probability distribution of the mixture model, wherein the signed binary value is to be produced by subtraction of a first variable relating to a standard deviation from a second variable relating to a distance of a sample from a mean of the mixture model;
         extracting a value of a sign bit from the signed binary value, the value of the sign bit to be utilized as a decision variable; and
         updating, using the one or more multiplier-accumulator blocks, a parameter of the first probability distribution, wherein the decision variable is utilized by the one or more multiplier-accumulator blocks for the update of the parameter of the first probability distribution; and
      execute second operations for a second sample and the mixture model;
      wherein two or more operations of the first operations and the second operations are executed during a same clock cycle by the digital signal processor.

19. The digital signal processor of claim 18, wherein the instructions further cause the digital signal processor to determine one or more further decision variables based on the second sample during a same clock cycle as whether the first sample matches the first probability distribution is determined or the parameter of the first probability distribution is updated.

20. The digital signal processor of claim 18, wherein the one or more multiplier-accumulator blocks implement an infinite impulse response filter to update the parameter of the first probability distribution.

* * * * *